United States Patent
Chen et al.

(10) Patent No.: US 10,884,645 B2
(45) Date of Patent: Jan. 5, 2021

(54) VIRTUAL MACHINE HOT MIGRATION METHOD, HOST MACHINE AND STORAGE MEDIUM

(71) Applicant: TENCENT TECHNOLOGY (SHENZHEN) COMPANY LIMITED, Shenzhen (CN)

(72) Inventors: Lidong Chen, Shenzhen (CN); Xing Zhao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/949,874

(22) Filed: Apr. 10, 2018

(65) Prior Publication Data
US 2018/0232175 A1  Aug. 16, 2018

Related U.S. Application Data

(63) Continuation of application No. PCT/CN2017/092495, filed on Jul. 11, 2017.

(30) Foreign Application Priority Data

Jul. 12, 2016  (CN) .......................... 2016 1 0548058

(51) Int. Cl.
*G06F 3/06* (2006.01)
*G06F 9/48* (2006.01)
*G06F 9/455* (2018.01)

(52) U.S. Cl.
CPC .......... *G06F 3/0647* (2013.01); *G06F 3/0604* (2013.01); *G06F 3/067* (2013.01);
(Continued)

(58) Field of Classification Search
CPC .... G06F 3/0647; G06F 3/0604; G06F 3/0652; G06F 3/0664; G06F 3/067; G06F 9/455; G06F 9/4558; G06F 9/4856
See application file for complete search history.

(56) References Cited

U.S. PATENT DOCUMENTS 8,813,240 B1* 8/2014 Northup ................ G06F 21/554
                                                 726/22
8,996,468 B1* 3/2015 Mattox ................... G06F 11/00
                                                 707/650
(Continued)

FOREIGN PATENT DOCUMENTS

CN        102622309        8/2012
CN        102681913        9/2012
(Continued)

OTHER PUBLICATIONS

International Search Report dated Oct. 27, 2017 in PCT/CN2017/092495 filed Jul. 11, 2017 (With English Translation).
(Continued)

*Primary Examiner* — Nanci N Wong
(74) *Attorney, Agent, or Firm* — Oblon, McClelland, Maier & Neustadt, L.L.P.

(57) ABSTRACT

This application discloses a virtual machine (VM) hot migration method, an apparatus, and a storage medium. A method for virtual machine (VM) hot migration is described. Processing circuitry of a first host machine identifies that a memory block in a storage device of the first host machine is allocated to a virtual machine to migrate. Further, the processing circuitry determines whether the memory block is data-containing. When the memory block is data-containing, interface circuitry of the first host machine sends data in the memory block to a second host machine. When the memory block is not data-containing, the memory block is skipped for migration.

13 Claims, 5 Drawing Sheets

(52) U.S. Cl.
CPC .......... *G06F 3/0613* (2013.01); *G06F 3/0652* (2013.01); *G06F 3/0664* (2013.01); *G06F 9/45558* (2013.01); *G06F 9/4856* (2013.01); *G06F 2009/4557* (2013.01)

(56) References Cited

U.S. PATENT DOCUMENTS

| | | | |
|---|---|---|---|
| 9,430,162 B1* | 8/2016 | McBride | G06F 3/065 |
| 9,946,604 B1* | 4/2018 | Glass | G06F 3/065 |
| 2014/0229949 A1* | 8/2014 | Cai | G06F 9/45533 718/1 |
| 2015/0052254 A1 | 2/2015 | Zhao | |
| 2015/0355862 A1* | 12/2015 | Hayes | G06F 3/067 711/114 |
| 2016/0110215 A1 | 4/2016 | Bonilla et al. | |
| 2017/0235507 A1* | 8/2017 | Sinha | G06F 16/2365 711/114 |
| 2018/0121112 A1* | 5/2018 | Imazaki | G06F 3/067 |

FOREIGN PATENT DOCUMENTS

| | | |
|---|---|---|
| CN | 102724277 | 10/2012 |
| CN | 103902368 | 7/2014 |
| CN | 104270416 | 1/2015 |
| CN | 104536816 | 4/2015 |
| CN | 106201659 | 12/2016 |

OTHER PUBLICATIONS

International Preliminary Report dated Jan. 15, 2019 in PCT/CN2017/092495 filed Jul. 11, 2017. (With English Translation).
Written Opinion dated Oct. 9, 2017 in PCT/CN2017/092495 filed Jul. 11, 2017. (With English Translation).
Office Action dated Oct. 18, 2018 in Chinese Patent Application No. 201610548058.9 (With Concise English Translation).
Office Action dated Jan. 31, 2019 in Chinese Patent Application No. 201610548058.9 (With Concise English Translation).

* cited by examiner

VIRTUAL MACHINE HOT MIGRATION METHOD, HOST MACHINE AND STORAGE MEDIUM

RELATED APPLICATION

This application is a continuation of International Application No. PCT/CN2017/092495, filed on Jul. 11, 2017, which claims priority to Chinese Patent Application No. 201610548058.9, filed with the Chinese Patent Office on Jul. 12, 2016, and entitled "VIRTUAL MACHINE HOT MIGRATION METHOD AND HOST MACHINE". The entire disclosures of the prior applications are hereby incorporated by reference in their entirety.

FIELD OF THE TECHNOLOGY

This application relates to the field of cloud technologies, and specifically, to a virtual machine hot migration method, a host machine, and a storage medium.

BACKGROUND OF THE DISCLOSURE

Usually, a cloud computing system includes a control device and a large quantity of host machines. The control device may simulate and create one or more virtual machines (VM) on a host machine by using VM software, and these VMs work such as real computers.

Usually, a host machine may create multiple VMs. These VMs may run on the host machine and executes a corresponding function requested by a user. In some cases, for example, when a fault or a potential security risk occurs in the host machine, the VMs on the host machine need to be migrated to another normal host machine to ensure that use of the VMs by a user is not affected.

In a process of VM hot migration, data in each memory block of disk storage space corresponding to the VM needs to be migrated. This leads to low efficiency of VM hot migration.

SUMMARY

To resolve a problem that the efficiency of virtual machine (VM) hot migration is low in the related technology, embodiments of this application provide a VM hot migration method. Hot migration is performed on a memory block having data and a memory block without data is directly skipped, thereby improving the efficiency of VM hot migration. The embodiments of this application further provide a corresponding host machine.

A method for virtual machine (VM) hot migration is described. Processing circuitry of a first host machine identifies that a memory block in a storage device of the first host machine is allocated to a virtual machine to migrate. Further, the processing circuitry determines whether the memory block is data-containing. When the memory block is data-containing, interface circuitry of the first host machine sends data in the memory block to a second host machine. When the memory block is not data-containing, the memory block is skipped for migration.

In an embodiment, when a fault occurs in the first host machine, the processing circuitry of the first host machine determines to migrate a plurality of virtual machine s that run on the first host machine. In another embodiment, the processing circuitry of the first host machine determines to migrate one or more virtual machine s when a load of the first host machine exceeds a preset threshold. In an example, the one or more virtual machines are selected when removing a load amount of the one or more VMs reduces the load of the first host machine below the preset threshold.

In some embodiments, to determine whether the memory block is data-containing, the processing circuitry detects a data deletion record associated with the memory block; and determines that the memory block is data-containing based on the detection of the data deletion record.

In some embodiments, when the memory block is data-containing, the processing circuitry erases the memory block in the storage device after the sending the data in the memory block to the second host machine.

Aspects of the disclosure provide a first host machine for hosting virtual machines. The first host machine includes a storage device, interface circuitry and processing circuitry. The storage device includes a plurality of memory blocks. The interface circuitry is configured to couple the first host machine with a second host machine via a network. The processing circuitry is configured to identify that a memory block in the storage device of the first host machine is allocated to a virtual machine to migrate. Then the processing circuitry identifies whether the memory block is data-containing. When the memory block is data-containing, the processing circuitry sends, via the interface circuitry, data in the memory block to the second host machine. When the memory block is not data-containing, the processing circuitry can skip the memory block, and identify a next memory block that is allocated to the virtual machine.

Aspects of the disclosure provide a non-transitory computer-readable medium storing instructions which when executed by a processor in a first host machine cause the first host machine to perform operations for virtual machine (VM) hot migration. The operations include identifying a memory block in a storage device of the first host machine that is allocated to a virtual machine to migrate, and determining whether the memory block is data-containing. When the memory block is data-containing, the operations include sending, via interface circuitry of the first host machine, data in the memory block to a second host machine. When the memory block is not data-containing, the memory block is skipped.

Compared with the low efficiency of VM hot migration in the related technology, in the VM hot migration method provided by the embodiments of this application, hot migration is performed on a memory block having data, and a memory block without data is directly skipped, thereby improving the efficiency of VM hot migration.

BRIEF DESCRIPTION OF THE DRAWINGS

To describe the technical solutions of embodiments of this application more clearly, the following briefly introduces the accompanying drawings required for describing the embodiments. The accompanying drawings in the following description show some embodiments of this application, and a person of ordinary skill in the art may still derive other drawings from these accompanying drawings.

DESCRIPTION OF EMBODIMENTS

Embodiments of this application provide a virtual machine (VM) hot migration method. Hot migration refers to the process to migrate a virtual machine without shutting down the virtual machine, thus the virtual machine is operational and active during the hot migration. In some embodiments, hot migration is performed on a memory block having data, and a memory block without data is directly skipped, thereby improving the efficiency of VM hot migration. The embodiments of this application further provide a corresponding host machine. Details descriptions are separately provided below.

The following clearly and completely describes the technical solutions in the embodiments of this application with reference to the accompanying drawings in the embodiments of this application. The described embodiments are some embodiments of this application rather than all of the embodiments. All other embodiments obtained by a person skilled in the art based on the embodiments of this application shall fall within the protection scope of this application.

Figure 1:
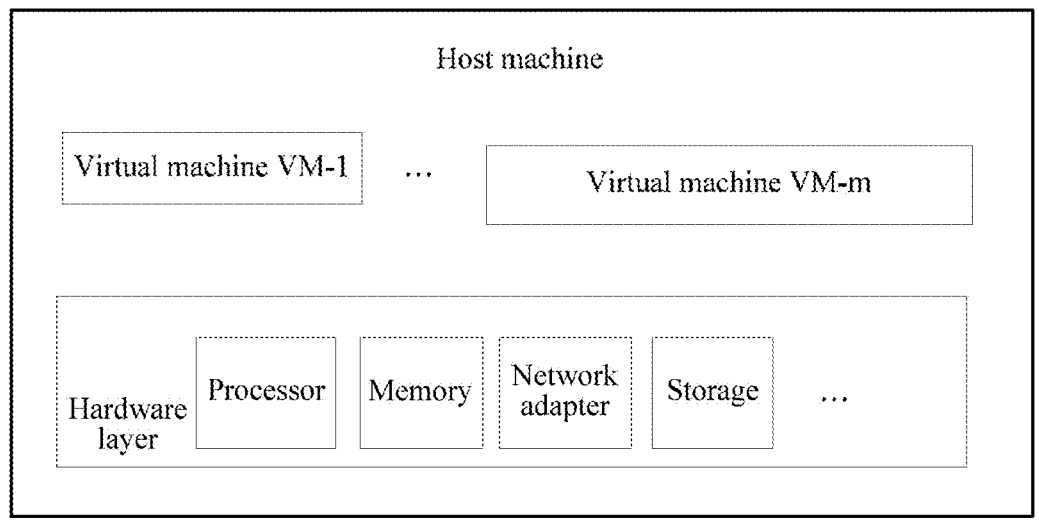
FIG. 1 is a schematic structural diagram of a host machine according to an embodiment of this application.

FIG. 1 is a schematic structural diagram of a host machine according to an embodiment of this application.

The host machine shown in FIG. 1 includes a VM and a hardware layer. The hardware layer may provide a hardware resource for the VM.

VM:

One or more virtual computers may be simulated on a host machine by using VM software, and theses VMs work such as real computers. An operating system and a corresponding program may be installed on the VM. The VM may also access to a network resource. An application program can run on a VM as working on a real computer.

Hardware Layer:

A hardware layer is a hardware platform on which a virtualized environment runs. The hardware layer may include multiple types of hardware. For example, a hardware layer of a computing node may include a processor (for example, a central processing unit (CPU)) and a memory, and may further include a high speed or low speed input/output (I/O) device such as a network adapter or a storage, and another device having a particular processing function, for example, an input/output memory management unit (IOMMU). The IOMMU may be configured to convert a VM physical address and a Host physical address.

VM hot migration refers to migrating a VM on a source host machine to a target host machine. The VM does not stop running during migration.

Figure 2:
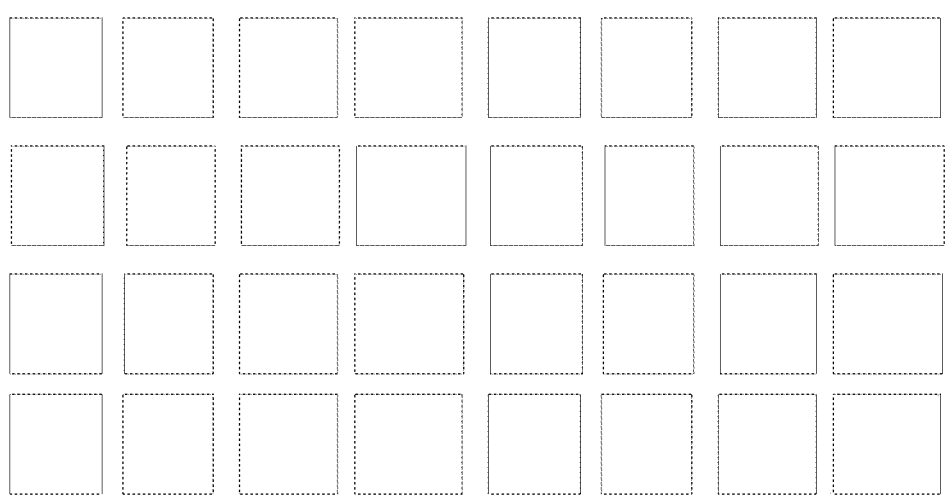
FIG. 2 is a schematic diagram of a memory block according to an embodiment of this application.

Disk storage space is usually formed by a memory block. For disk storage space corresponding to a target VM to be migrated, refer to FIG. 2 for understanding. The disk storage space includes multiple memory blocks, and what is shown in FIG. 2 is merely illustrative and should not be understood as a limitation to a quantity of the memory block.

In a process of VM hot migration, usually, data in each memory block of the disk storage space corresponding to the target VM needs to be migrated. However, for a user, when the user uses a newly-created VM, a data quantity in disk storage space corresponding to the newly-created VM is small, so that many memory blocks of the disk storage space have zero data. If theses memory blocks with zero data are also replicated, a hot migration time is undoubtedly wasted. Therefore, this embodiment of this application provides a VM hot migration method. Hot migration may be performed on a memory block having data, and a memory block without data is directly skipped, thereby improving the efficiency of VM hot migration.

The host machine is usually located in a cloud computing system. The cloud computing system usually includes a control device and multiple host machines. Therefore, when a fault occurs in a host machine or the host machine has a too heavy load, the control device coordinates a VM on the host machine to perform hot migration.

Figure 3:
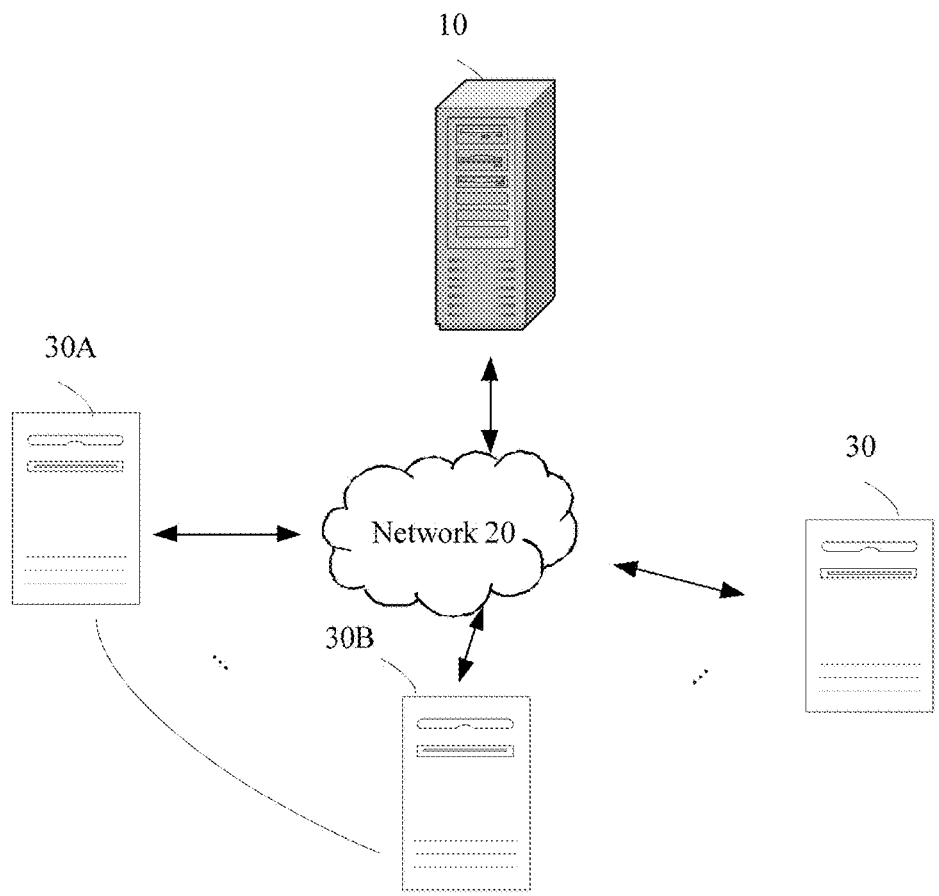
FIG. 3 is a schematic diagram of an embodiment of a cloud computing system according to an embodiment of this application.

As shown in FIG. 3, an embodiment of a cloud computing system provided by an embodiment of this application includes the following.

The cloud computing system includes a control device 10, a network 20 and multiple host machines 30. The multiple host machines 30 include a host machine 30A and a host machine 30B. The control device 10 is in a communication connection to the multiple host machines 30 by using the network 20. Each host machine includes multiple VMs.

The control device 10 requests current load information from each host machine in real time or periodically. For example, the control device 10 requests current CPU usage. Alternatively, each host machine reports the load information of the host machine to the control device 10 in real time or periodically.

The control device 10 determines a source host machine whose load amount exceeds a preset threshold according to the load information of each host machine. For example, if the preset threshold is 70% of the CPU usage, the control device 10 may determine a host machine whose CPU usage exceeds 70% according to the load information of each host machine. For example, when it is determined that the CPU usage of the host machine 30A in FIG. 3 exceeds 70%, the host machine 30A is determined to be the source host machine whose load amount exceeds the preset threshold.

After the source host machine is determined, the control device 10 determines a target VM from VMs that are of the host machine 30A and that are currently in a running state. The target VM is a VM enabling the load amount of the source host machine to decrease below the preset threshold after hot migration.

After the target VM is determined, the control device 10 determines a target host machine according to the load information of each host machine and load occupancy of the target VM. The target host machine is a host machine whose load amount does not exceed the preset threshold after carrying the target VM. As shown in FIG. 3, the determined target host machine is the host machine 30B.

Certainly, if a host machine integrates with a load monitoring function of the control device and the load information of another host machine, the host machine may also determine the target host machine.

The control device 10 controls the target VM to hot-migrate from a source host machine to the target host machine. That is, the target VM is hot-migrated from the host machine 30A to the host machine 30B.

Figure 4:
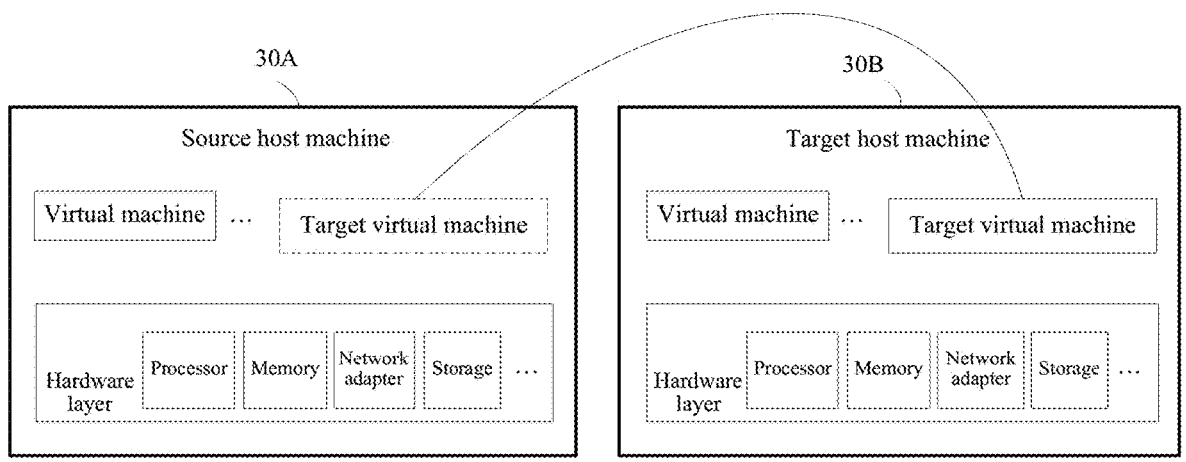
FIG. 4 is a schematic diagram of an embodiment of virtual machine (VM) hot migration according to an embodiment of this application.

For a process of hot-migrating the host machine, refer to FIG. 4 for understanding. As shown in FIG. 4, a target VM is hot-migrated from a host machine 30A to a host machine 30B. During hot migration of the target VM, usage of the target VM by a user is not affected, so that the user does not sense.

Figure 5:
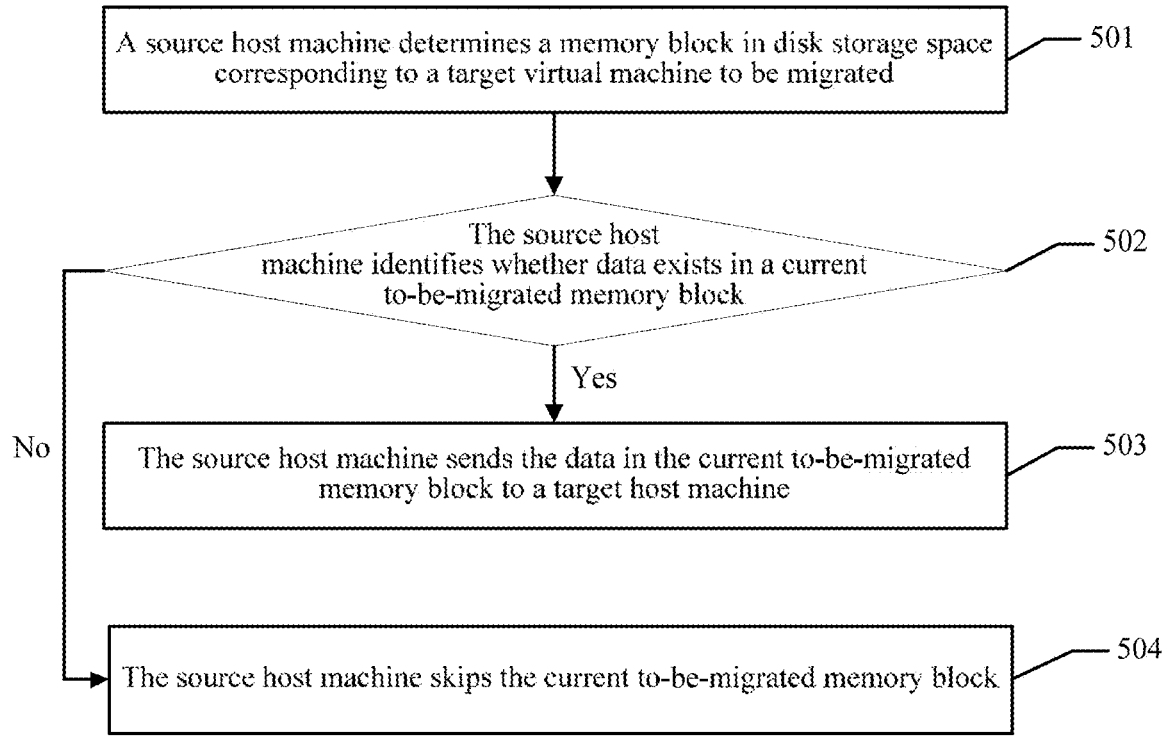
FIG. 5 is a schematic diagram of an embodiment of a method for hot-migrating a VM according to an embodiment of this application.

The process of VM hot migration actually is a process of hot migration of data related to the VM. The following describes the process of VM hot migration of an embodiment of this application with reference to FIG. 5. FIG. 5 shows a VM hot migration method performed on a host machine. The host machine includes one or more processors and a storage medium storing operation instructions, the processor runs the operation instructions stored in the storage medium to perform the method, and the method includes:

501: A source host machine determines a memory block in disk storage space corresponding to a target VM to be migrated.

The target VM to be migrated may be notified to the source host machine after being determined by a control device, or may be determined by the source host machine. For example, when a potential security risk or a fault occurs in the source host machine, all VMs on the source host machine may be determined as the target VMs.

Each VM has corresponding disk storage space, for example, a first array to a fifth array of the disk storage space. The disk storage space of the VM is not multiplexed. That is, the disk storage space of each VM is independent.

The disk storage space includes multiple memory blocks. Some of these memory blocks are configured to store metadata, and some are configured to store content data.

Metadata: mainly used for recording a storage location of a user file on a disk. Loss or damage of metadata leads to loss of user data.

Figure 6:
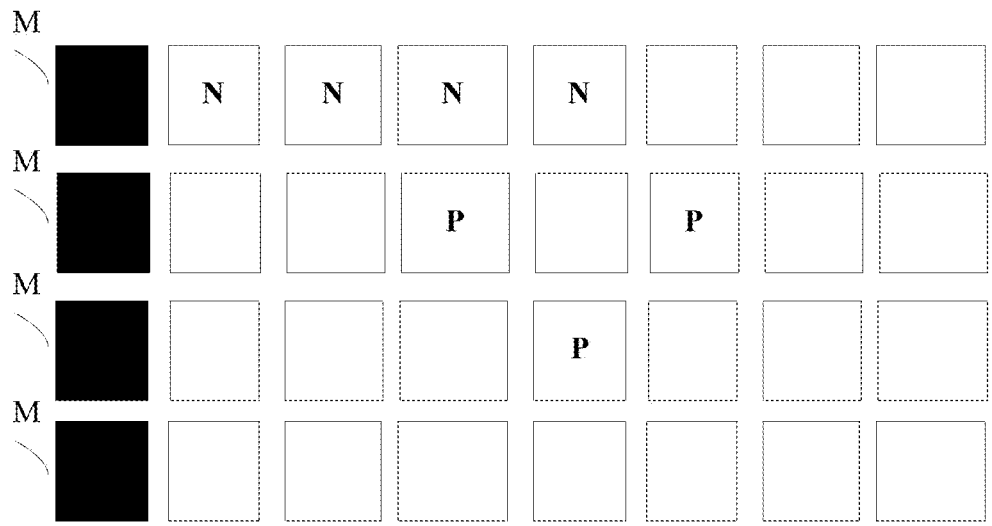
FIG. 6 is another schematic diagram of a memory block according to an embodiment of this application.

As shown in FIG. 6, data stored in memory blocks identified as M in the memory blocks is metadata of the user file. Data stored in memory blocks identified as N is data that is used by a user at present. Data stored in memory blocks identified as P is data that is deleted after being used by the user. Memory blocks that are not identified have no data.

502: The source host machine identifies whether data exists in a current to-be-migrated memory block, and the current to-be-migrated memory block is a memory block in the disk storage space. When yes, perform step 503; when no, perform step 504.

The current to-be-migrated memory block is a memory block identified by the source host machine. After determining the memory blocks of the target VM, the source host machine sequentially identifies the memory blocks. Certainly, the source host machine may alternatively identify multiple memory blocks simultaneously. The source host machine identifies whether data is stored in the memory block.

503: When data exists in the current to-be-migrated memory block, the source host machine sends the data in the current to-be-migrated memory block to a target host machine.

When data exists in the memory block, the data in the memory block needs to be migrated to the target host machine. Data migration is to send the data in the memory block to the target host machine, and to transfer the data in the memory block to the target host machine to be stored.

Even if the data in the memory block is data deleted by a user, the data in the memory block still needs to be transferred to the target host machine, so that the user restores the deleted data or file when the user needs the data or file.

The deleted data is invisible to the user, but in fact, the deleted data is stored in the memory block without being erased.

Figure 7:
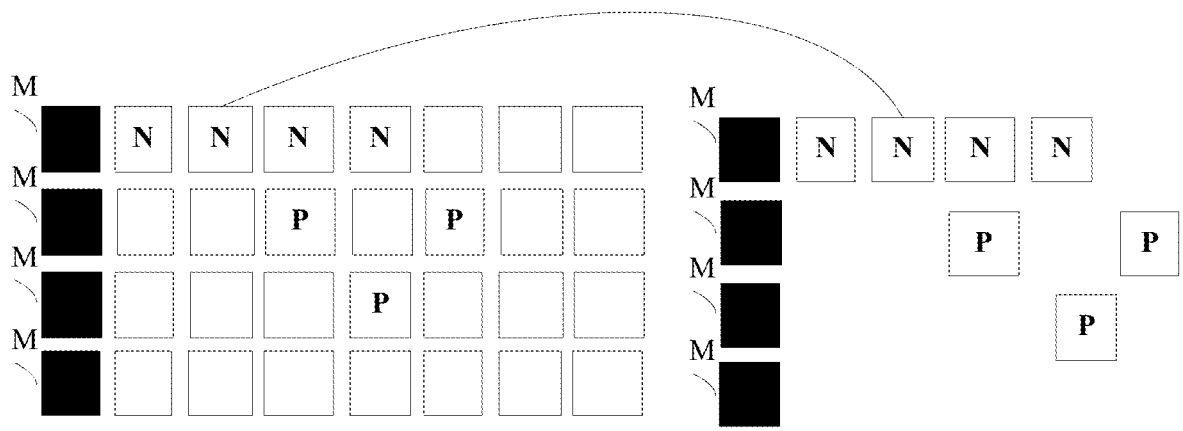
FIG. 7 is a schematic diagram of an embodiment of data hot migration according to an embodiment of this application.

For a data migration process, refer to FIG. 7 for understanding. Corresponding hot migration is performed on data in a memory block, and the data is transferred to be stored in a memory block of a target host machine.

504: The source host machine skips the current to-be-migrated memory block when no data exists in the current to-be-migrated memory block.

When it is identified that no data exists in the memory block, replication and migration do not need to be performed. The memory block is directly skipped and a next memory block is identified.

Compared with the low efficiency of VM hot migration in the related technology, in the VM hot migration method provided by this embodiment of this application, hot migration is performed on a memory block having data, and a memory block without data is directly skipped, thereby improving the efficiency of VM hot migration.

Optionally, before the source host machine determines the memory block in the disk storage space corresponding to the target VM to be migrated, the method may further include:

determining, by the source host machine, each VM created on the source host machine as the target VM when a fault occurs in the source host machine.

In this embodiment of this application, when a fault occurs in the source host machine, all VMs on the source host machine need to be migrated, to ensure that use of the VM by a user is not affected. In this case, all the VMs on the source host machine need to be determined as the target VMs, and then hot migration is performed on multiple target VMs on the source host machine by using the foregoing migration method of the target VM. Herein, hot migration may be simultaneously or sequentially performed on the multiple target VMs on the source host machine. This is not limited in the present disclosure.

Optionally, before the source host machine determines the memory block in the disk storage space corresponding to the target VM to be migrated, the method may further include:

determining, by the source host machine according to load occupancy of each VM in the source host machine, the target VM when a load of the source host machine exceeds a preset threshold, the target VM being a VM enabling a load amount of the source host machine to decrease below the preset threshold after hot migration.

In this embodiment of this application, when the load of the source host machine exceeds the preset threshold, a responding speed of each VM may be affected. Therefore, the source host machine needs to migrate one or more VMs with a large load amount to release pressure of the source host machine. For such a migration solution, refer to the descriptions in FIG. 3 for understanding and no details are further provided herein again.

Optionally, the identifying, by the source host machine, whether data exists in a current to-be-migrated memory block may include:

determining, by the source host machine when identifying that a data deletion record exists in the current to-be-migrated memory block, that data exists in the current to-be-migrated memory block.

In this embodiment of this application, data in the memory block may be data deleted by a user at a user side.

Even if the user deletes the data, the data is still kept in the memory block of the VM, so that the data can be restored when the user needs to use the data.

Optionally, after the data in the memory block corresponding to the target VM on the source host machine is completely migrated to the target VM on the target host machine, the method may further include:

erasing the memory block in the disk storage space corresponding to the target VM on the source host machine, to destroy the data that is generated by the target VM and that is in the memory block.

Figure 8:
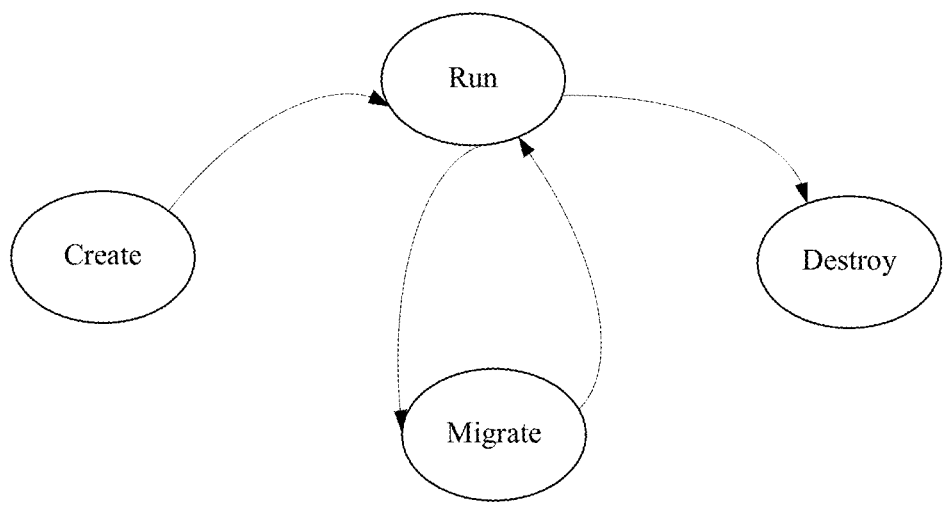
FIG. 8 is a schematic diagram of a life cycle of a VM according to an embodiment of this application.

In an embodiment of this application, a VM has a life cycle. As shown in FIG. 8, the life cycle of the VM includes creation, running, migration and destroying. After being created, the VM is put into running. In a running process, storage space of the VM keeps data of a user using the VM. Once the VM is migrated to another host machine, or the VM is destroyed on host machine, data in the storage space corresponding to the VM needs to be completely erased. In this way, data security of the user using the VM may be ensured, so as to prevent that another user uses a data restoring function to restore data of an original user when the storage space corresponding to the VM is used by another user.

The foregoing is a description of VM hot migration, and the following describes a host machine in an embodiment of this application.

Figure 9:
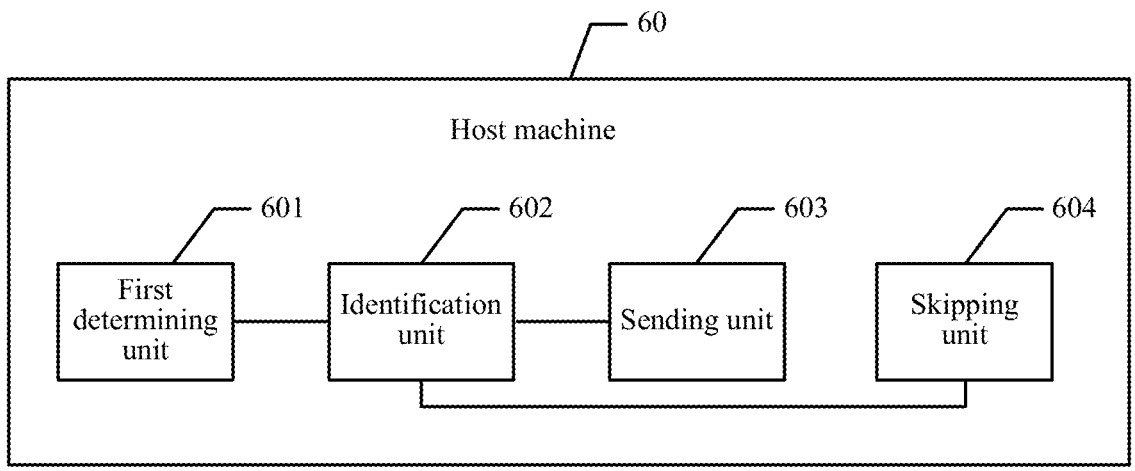
FIG. 9 is a schematic diagram of an embodiment of a host machine according to an embodiment of this application.

Referring to FIG. 9, FIG. 9 shows an embodiment of the host machine 60 provided by an embodiment of this application. The host machine herein represents a source host machine. The host machine includes:

a first determining unit 601, configured to determine a memory block in disk storage space corresponding to a target VM to be migrated;

an identification unit 602, configured to identify whether data exists in a current to-be-migrated memory block determined by the first determining unit 601, the current to-be-migrated memory block being a memory block in the disk storage space;

a sending unit 603, configured to send, when the identification unit 602 identifies that data exists in the current to-be-migrated memory block, the data in the current to-be-migrated memory block to a target host machine; and a skipping unit 604, configured to skip the current to-be-migrated memory block when the identification unit 602 identifies that no data exists in the current to-be-migrated memory block.

Compared with the low efficiency of VM hot migration in the related technology, the host machine provided by this embodiment of this application performs hot migration on a memory block having data, and directly skips a memory block without data, thereby improving the efficiency of VM hot migration.

Figure 10:
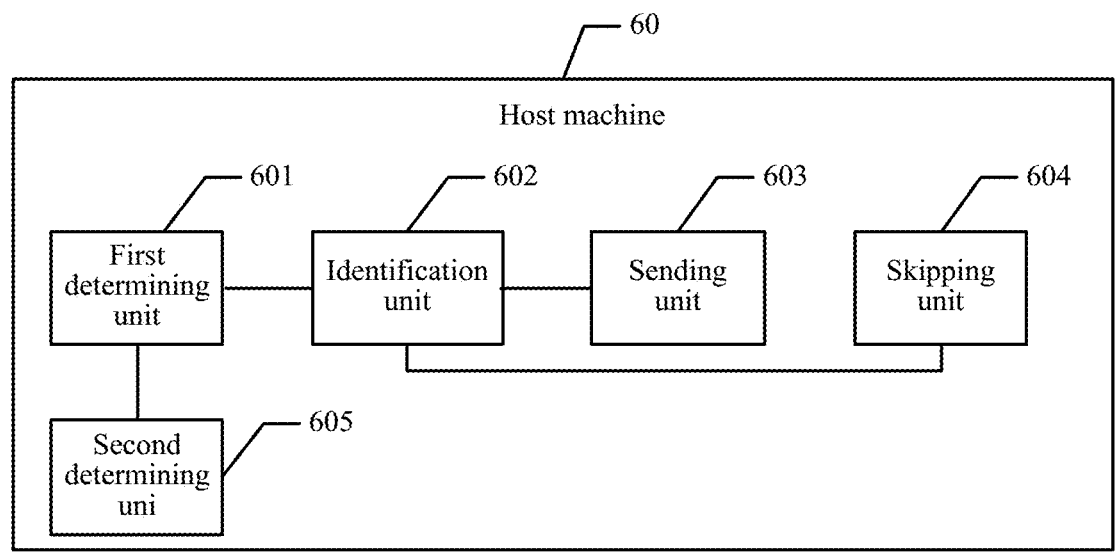
FIG. 10 is a schematic diagram of another embodiment of a host machine according to an embodiment of this application.

Optionally, referring to FIG. 10, in another embodiment of the host machine provided by an embodiment of this application, the host machine further includes a second determining unit 605.

The second determining unit 605 is configured to: before the first determining unit 601 determines the memory block in the disk storage space corresponding to the target VM to be migrated, determine each VM created on the source host machine as the target VM when a fault occurs in the source host machine.

In this embodiment of this application, when a fault occurs in the source host machine, all VMs on the source host machine need to be migrated, to ensure that use of the VM by a user is not affected. In this case, all the VMs on the source host machine need to be determined as the target VMs. The hot migration processing solution for multiple target VMs of the source host machine is the same with the hot migration processing solution for one target VM.

Optionally, the second determining unit 605 may be configured to: determine, according to load occupancy of each VM in the source host machine, the target VM when a load of the source host machine exceeds a preset threshold, the target VM being a VM enabling a load amount of the source host machine to decrease below the preset threshold after hot migration.

In this embodiment of this application, when the load of the source host machine exceeds the preset threshold, a responding speed of each VM may be affected. Therefore, the source host machine needs to migrate one or more VMs with a large load amount to release pressure of the source host machine. For such a migration solution, refer to the descriptions in FIG. 3 for understanding and no details are further provided herein again.

Optionally, the identification unit 602 is configured to determine that data exists in the current to-be-migrated memory block when the identification unit 602 identifies that a data deletion record exists in the current to-be-migrated memory block.

In this embodiment of this application, data in the memory block may be data deleted by a user at a user side. Even if the user deletes the data, the data is still kept in the memory block of the VM, so that the data can be restored when the user needs to use the data.

Optionally, the host machine 60 provided in this embodiment of this application may further include:

an erasing unit, configured to: after the sending unit 603 completely migrates the data in the memory block corresponding to the target VM on the host machine to the target VM of the target host machine, erase the memory block in the disk storage space corresponding to the target VM on the host machine, to destroy the data that is generated by the target VM and that is in the memory block.

In an embodiment of this application, a VM has a life cycle. As shown in FIG. 8, the life cycle of the VM includes creation, running, migration and destroying. After being created, the VM is put into running. In a running process, storage space of the VM keeps data of a user using the VM. Once the VM is migrated to another host machine, or the VM is destroyed on host machine, data in the storage space of the VM corresponding to the host machine needs to be completely erased. In this way, data security of the user using the VM may be ensured, so as to prevent that another user uses a data restoring function to restore data of an original user when the storage space corresponding to the VM is used by another user.

Figure 11:
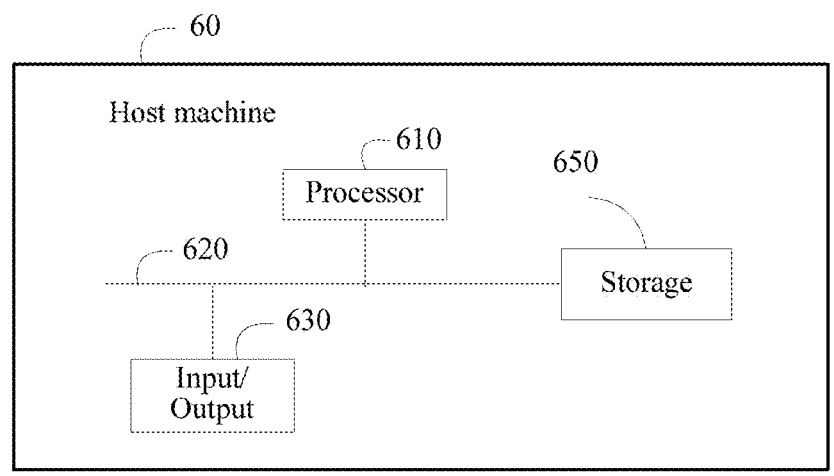
FIG. 11 is a schematic diagram of another embodiment of a host machine according to an embodiment of this application.

FIG. 11 is a schematic structural diagram of a host machine 60 according to an embodiment of this application. The host machine 60 is applied to a cloud computing system. The cloud computing system includes multiple host machines. Each host machine includes multiple VMs. The host machine 60 includes a processor 610, a storage 650, and an input/output device 630. The storage 650 may include a read-only memory and a random access memory, and provides an operation instruction and data for the processor 610. A part of the storage 650 may further include a non-volatile random access memory (NVRAM).

In some implementations, the storage 650 stores the following elements an executable module or a data structure, or a subset thereof, or an extension set thereof.

In this embodiment of this application, by invoking the operating instruction (the operating instruction may be stored in an operating system) stored by the storage 650, a memory block in disk storage space is determined corresponding to a target VM to be migrated;

whether data exists in a current to-be-migrated memory block is identified, and the current to-be-migrated memory block is a memory block in the disk storage space;

when data exists in the current to-be-migrated memory block, the data in the current to-be-migrated memory block is sent to a target host machine; and the current to-be-migrated memory block is skipped when no data exists in the current to-be-migrated memory block.

Compared with the low efficiency of VM hot migration in the related technology, the host machine provided by this embodiment of this application performs hot migration on a memory block having data, and directly skips a memory block without data, thereby improving the efficiency of VM hot migration.

The processor 610 controls an operation of the host machine 60, and the processor 610 may also be referred to as a CPU. The storage 650 may include a read-only memory and a random access memory, and provides an instruction and data to the processor 610. A part of the storage 650 may further include a non-volatile random access memory (NVRAM). In a specific application, all components of the host machine 60 are coupled by using a bus system 620, and in addition to a data bus, the bus system 620 may further include a power source bus, a control bus, a state signal bus, and the like. But, for ease of clear description, all types of buses in the diagram are marked as the bus system 620.

The method disclosed in the foregoing embodiments of this application may be applied to the processor 610, or may be implemented by the processor 610. The processor 610 may be an integrated circuit chip and has a signal processing capability. In an implementation process, steps in the foregoing method may be implemented through a hardware integrated logical circuit in the processor 610, or an instruction in the form of software. The processor 610 may be a general-purpose processor, a digital signal processor (DSP), an application-specific integrated circuit (ASIC), a field programmable gate array (FPGA), another programmable logic component, a discrete gate or a transistor logic device, or a discrete hardware component, and may implement or execute methods, steps, and logical block diagrams disclosed in the embodiments of this application. The general-purpose processor may be a micro-processor, or the processor may also be any suitable processor. The steps in the methods disclosed in the embodiments of this application may be directly implemented by a hardware decoding processor, or may be implemented by combining hardware and software modules in a decoding processor. The software module may be located in a mature storage medium in the field, such as a random access memory, a flash memory, a read-only memory, a programmable read-only memory, an electrically erasable programmable memory, or a register. The storage medium is located in the storage 650, and the processor 610 reads information in the storage 650 and performs the steps of the foregoing method in combination with hardware of the processor.

Optionally, the processor 610 is further configured to: determine each VM created on the source host machine as a target VM when a fault occurs in a source host machine.

Optionally, the processor 610 is further configured to: determine, according to load occupancy of each VM in the source host machine, the target VM when a load of the source host machine exceeds a preset threshold, the target VM being a VM enabling a load amount of the source host machine to decrease below the preset threshold after hot migration.

Optionally, the processor 610 is configured to determine that data exists in the current to-be-migrated memory block when it is identified that a data deletion record exists in the current to-be-migrated memory block.

Optionally, the processor 610 is further configured to: after data in the memory block corresponding to the target VM in the host machine is completely migrated to a target VM in the target host machine, erase the memory block in the disk storage space corresponding to the target VM in the host machine, to destroy the data that is generated by the target VM and that is in the memory block.

The host machine described in the foregoing FIG. 11 may be understood by referring to corresponding descriptions in FIG. 1 to FIG. 8, and no further details are provided herein.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

A person of ordinary skill in the art may understand that all or some of the steps of the methods in the embodiments may be implemented by a program instructing relevant hardware. The program may be stored in a computer-readable storage medium. The storage medium may include: a ROM, a RAM, disk storage space, an optical disc, or the like.

The VM hot migration method and the host machine provided by the embodiments of this application are described in detail in the foregoing, and the text applies specific examples to describe the principle and implementations of this application. The foregoing descriptions of the embodiments are only intended to help understand the method and core idea of this application. Meanwhile, to persons of ordinary skill in the art, changes can be made on the specific implementations and application range according to the idea of this application. In conclusion, the content of the specification should not be construed as a limit to this application.

What is claimed is:

1. A method for a virtual machine (VM) hot migration, the method comprising:

determining, by processing circuitry of a first host machine, to migrate a plurality of virtual machines that run on the first host machine when a security risk occurs in the first host machine;

identifying, by the processing circuitry of the first host machine, a memory block in a storage device of the first host machine that is allocated to one of the virtual machines being migrated;

creating, by the processing circuitry, a data deletion record in response to a data deletion request;

detecting, by the processing circuitry, the data deletion record associated with the memory block;

determining, by the processing circuitry, that the memory block associated with the data deletion record contains data when the data deletion record is detected;

sending, via interface circuitry of the first host machine, the data in the memory block to a second host machine when the memory block contains the data;

skipping the memory block when the memory block does not contain the data; and when a restoring is requested, restoring, by the processing circuitry, data associated with the data deletion record, the data being restored in a memory block in a storage device of the second host machine, wherein memory blocks of the respective virtual machines are independently managed from each other without being multiplexed.

2. The method according to claim 1, wherein before the identifying the memory block in the storage device of the first host machine that is allocated to one of the virtual machines to migrate, the method further comprises:

determining, by the processing circuitry of the first host machine, to migrate the plurality of virtual machines that run on the first host machine when a fault occurs in the first host machine.

3. The method according to claim 1, wherein before the identifying the memory block in the storage device of the first host machine that is allocated to one of the virtual machines being migrated, the method further comprises:

determining, by the processing circuitry of the first host machine, to migrate one or more of the virtual machines when a load of the first host machine exceeds a preset threshold; and selecting the one or more of the virtual machines to be migrated when removing a load amount of the one or more of the virtual machines reduces the load of the first host machine below the preset threshold.

4. The method according to claim 1, wherein when the memory block contains the data, the method further comprises:

erasing the memory block in the storage device after the sending the data in the memory block to the second host machine.

5. The method according to claim 2, wherein when the memory block contains the data, the method further comprises:

erasing the memory block in the storage device after the sending the data in the memory block to the second host machine.

6. The method according to claim 3, wherein when the memory block contains the data, the method further comprises:

erasing the memory block in the storage device after the sending the data in the memory block to the second host machine.

7. A first host machine, comprising:

a storage device including a plurality of memory blocks; and interface circuitry configured to couple the first host machine with a second host machine via a network;

processing circuitry configured to:

determine to migrate a plurality of virtual machines that run on the first host machine when a security risk occurs in the first host machine;

identify a memory block of the plurality of memory blocks in the storage device of the first host machine that is allocated to one of the virtual machines being migrated;

create a data deletion record in response to a data deletion request;

detect the data deletion record associated with the memory block;

determine that the memory block associated with the data deletion record contains data when the data deletion record is detected;

send, via the interface circuitry, the data in the memory block to the second host machine when the memory block contains the data;

skip the memory block when the memory block does not contain the data; and when a restoring is requested, restore data associated with the data deletion record, the data being restored in a memory block in a storage device of the second host machine, wherein memory blocks of the respective virtual machines are independently managed from each other without being multiplexed.

8. The first host machine according to claim 7, wherein the processing circuitry is configured to:

determine to migrate the virtual machines that run on the first host machine when a fault occurs in the first host machine.

9. The first host machine according to claim 7, wherein the processing circuitry is configured to:

determine to migrate one or more of the virtual machines when a load of the first host machine exceeds a preset threshold; and select the one or more of the virtual machines to migrate when removing a load amount of the one or more of the virtual machines reduces the load of the first host machine below the preset threshold.

10. The first host machine according to claim 7, wherein when the memory block contains the data, the processing circuitry is configured to:

erase the memory block in the storage device after the data in the memory block is sent to the second host machine.

11. The first host machine according to claim 8, wherein when the memory block contains the data, the processing circuitry is configured to:

erase the memory block in the storage device after the data in the memory block is sent to the second host machine.

12. The first host machine according to claim 9, wherein when the memory block contains the data, the processing circuitry is configured to:

erase the memory block in the storage device after the data in the memory block is sent to the second host machine.

13. A non-transitory computer-readable medium storing instructions which when executed by a processor in a first host machine cause the first host machine to perform operations for virtual machine (VM) hot migration, the operations comprising:

determining to migrate a plurality of virtual machines that run on the first host machine when a security risk occurs in the first host machine;

identifying a memory block in a storage device of the first host machine that is allocated to one of the virtual machines to be migrated;

creating a data deletion record in response to a data deletion request;

detecting the data deletion record associated with the memory block;

determining that the memory block associated with the data deletion record contains data when the data deletion record is detected;

sending, via interface circuitry of the first host machine, the data in the memory block to a second host machine when the memory block contains the data;

skipping the memory block when the memory block does not contain the data; and when a restoring is requested, restoring data associated with the data deletion record, the data being restored in a memory block in a storage device of the second host machine, wherein memory blocks of the respective virtual machines are independently managed from each other without being multiplexed.

* * * * *